US010048865B2

(12) United States Patent
Mehra et al.

(10) Patent No.: US 10,048,865 B2
(45) Date of Patent: Aug. 14, 2018

(54) DISK PARTITION STITCHING AND REBALANCING USING A PARTITION TABLE

(71) Applicant: Microsoft Technology Licensing, LLC, Redmond, WA (US)

(72) Inventors: Karan Mehra, Sammamish, WA (US); Shi Cong, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 650 days.

(21) Appl. No.: 14/523,445

(22) Filed: Oct. 24, 2014

(65) Prior Publication Data

US 2016/0117115 A1    Apr. 28, 2016

(51) Int. Cl.
*G06F 3/06* (2006.01)

(52) U.S. Cl.
CPC .......... *G06F 3/0608* (2013.01); *G06F 3/0605* (2013.01); *G06F 3/0631* (2013.01); *G06F 3/0644* (2013.01); *G06F 3/0673* (2013.01); *G06F 3/0676* (2013.01)

(58) Field of Classification Search
CPC .... G06F 3/0608; G06F 3/0631; G06F 3/0644; G06F 3/0676; G06F 3/0605; G06F 3/0673
See application file for complete search history.

(56) References Cited

U.S. PATENT DOCUMENTS

| 6,330,653 | B1 | 12/2001 | Murray et al. |
| 7,631,155 | B1 | 12/2009 | Bono et al. |
| 7,849,353 | B1 * | 12/2010 | McKinney .......... G06F 11/1435 714/13 |
| 8,375,174 | B1 * | 2/2013 | Cartmell ............. G06F 12/0692 711/147 |

(Continued)

FOREIGN PATENT DOCUMENTS

WO     WO 9909513 A2    2/1999

OTHER PUBLICATIONS

Gorman, Mel. "Chapter 2 Describing Physical Memory" published by Kernel.org. Available online at https://www.kernel.org/doc/gorman/html/understand/understand005.html.*
"GUID Partition Table" by Wikipedia. Available online at https://en.wikipedia.org/wiki/GUID_Partition_Table.*
"Offset (computer science)" by Wikipedia. Available online at https://en.wikipedia.org/wiki/Offset_(computer_science).*

(Continued)

*Primary Examiner* — Ann J Lo
*Assistant Examiner* — Jane Wei
(74) *Attorney, Agent, or Firm* — Workman Nydegger (57) ABSTRACT

Embodiments are directed to dynamically changing partitions size for a partition in a storage device and to transferring storage space between partitions in a storage device. A computer system identifies portions of free space on a storage device, where the storage device has at least one partition whose offset and length are stored in a partition table. The computer system determines where the identified free space is located relative to other storage locations on the storage device. The computer system further determines that the partition is to be dynamically resized to a new size which (Continued)

is specified by one or more offset and length values, and based on where the identified free space is located, dynamically transforms the partition into a logical partition, and resizes the logical partition, the logical partition's offset and length values being updated in the partition table to include the new specified offset and length values.

20 Claims, 7 Drawing Sheets

(56) References Cited

U.S. PATENT DOCUMENTS

| | | | | |
|---|---|---|---|---|
| 8,635,429 | B1* | 1/2014 | Naftel | G06F 17/30238 711/162 |
| 2002/0199075 | A1* | 12/2002 | Jacobs | G06F 12/1425 711/163 |
| 2007/0260608 | A1* | 11/2007 | Hertzberg | G06F 9/466 |
| 2010/0318760 | A1* | 12/2010 | So | G06F 12/0246 711/173 |
| 2011/0138148 | A1* | 6/2011 | Friedman | G06F 3/0613 711/173 |
| 2012/0054306 | A1 | 3/2012 | Vaghani et al. | |
| 2013/0067191 | A1 | 3/2013 | Mehra et al. | |
| 2014/0089653 | A1* | 3/2014 | Jang | G06F 11/1435 713/2 |

OTHER PUBLICATIONS

"Second Written Opinion Issued in PCT Application No. PCT/US2015/055414", dated Sep. 12, 2016, 4 Pages.

"Virtual Provisioning for the New Vnx Series", in White Paper of EMC, Feb. 2014, 29 pages.

Warden, Tim, "Storage Pooling, Thin Provisioning and Over Subscription", a White Paper, Nov. 17, 2006, 11 pages.

M, et al., "Best Practices for Deployment of Oracle® ASM with Dell™ EqualLogic™ PS iSCSI Storage System", Published on: Jul. 2007, Available at: http://www.dell.com/downloads/global/solutions/Best_Practices_Oracle_ASM.pdf.

Mitchell, Robert, "Navigating Storage Spaces and Pools", Published on: Nov. 29, 2012, Available at: http://windowsitpro.com/windows/navigating-storage-spaces-and-pools.

"AIX Storage Management Physical Volumes, Logical Partitions", Retrieved on: Aug. 19, 2014, Available at: http://linuxhuman.com/Article/?674.html.

"Rebalancing Partitioned Region Data", Retrieved on: Aug. 19, 2014, Available at: http://pubs.vmware.com/vfabric53/index.jsp?topic=/com.vmware.vfabric.gemfire.7.0/developing/Partitioned_regions/rebalancing_pr_data.html.

"International Search Report & Written Opinion issued in PCT Application No. PCT/US2015/055414", dated Jan. 19, 2016, 12 pages.

International Preliminary Report on Patentability issued in PCT Application No. PCT/US2015/055414, dated Jan. 16, 2017.

* cited by examiner

DISK PARTITION STITCHING AND REBALANCING USING A PARTITION TABLE

BACKGROUND

Computing systems have become ubiquitous, ranging from small embedded devices to phones and tablets to PCs and backend servers. Each of these computing systems includes some type of data storage and typically, many different types of data storage. For example, a computing system may include solid-state storage and a hard drive or set of hard drives. These different storage devices may each have partitions, or logical allocations of data storage. Partitions are typically established upon the hardware's initial use. Thereafter, it becomes very difficult to rearrange or resize partitions. As such, larger-than-necessary partition sizes are chosen initially, resulting in wasted space on the storage device.

BRIEF SUMMARY

Embodiments described herein are directed to dynamically changing partitions size for a partition in a storage device and to transferring storage space between partitions in a storage device. A logical partition is comprised of at least one partition entry in the partition table. In one embodiment, a computer system identifies portions of free space on a storage device, where the storage device has at least one logical partition which includes one or more offset and length values (each offset and length pair identifies a disk portion and is stored as a separate partition entry in the partition table). The computer system determines where the identified free space is located relative to other storage locations on the storage device. The computer system further determines that the logical partition is to be dynamically resized to a new size which is specified by one or more offset and length values and, based on where the identified free space is located, dynamically resizes the logical partition so that the logical partition's offset and length values are updated in the partition table to include the new specified offset and length values.

In another embodiment, a computer system transfers storage space between logical partitions in a storage device. The computer system identifies portions of free space on the storage device. As above, the storage device has at least two existing logical partitions whose offset and length values are stored as partition entries in a partition table. The computer system determines where the identified free space is located relative to other storage locations on the storage device and, based on where the identified free space is located, dynamically re-assigns at least some of the determined free space from one logical partition to another different logical partition.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Embodiments described herein are directed to dynamically changing partitions size for a logical partition in a storage device and to transferring storage space between logical partitions in a storage device. In one embodiment, a computer system identifies portions of free space on a storage device, where the storage device has at least one logical partition which includes one or more offset and length values (each offset and length pair identifies a disk portion and is stored as a separate partition entry in the partition table). The computer system determines where the identified free space is located relative to other storage locations on the storage device. The computer system further determines that the logical partition is to be dynamically resized to a new size which is specified by one or more offset and length values and, based on where the identified free space is located, dynamically resizes the logical partition so that the logical partition's offset and length values are updated in the partition table to include the new specified offset and length values.

In another embodiment, a computer system transfers storage space between logical partitions in a storage device. The computer system identifies portions of free space on the storage device. As above, the storage device has at least two existing logical partitions whose offset and length values are stored as partition entries in a partition table. The computer system determines where the identified free space is located relative to other storage locations on the storage device and, based on where the identified free space is located, dynamically re-assigns at least some of the determined free space from one logical partition to another different logical partition.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may implement various types of computing systems. These computing systems are now increasingly taking a wide variety of forms. Computing systems may, for example, be handheld devices such as smartphones or feature phones, appliances, laptop computers, wearable devices, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. A computing system may be distributed over a network environment and may include multiple constituent computing systems.

Figure 1:
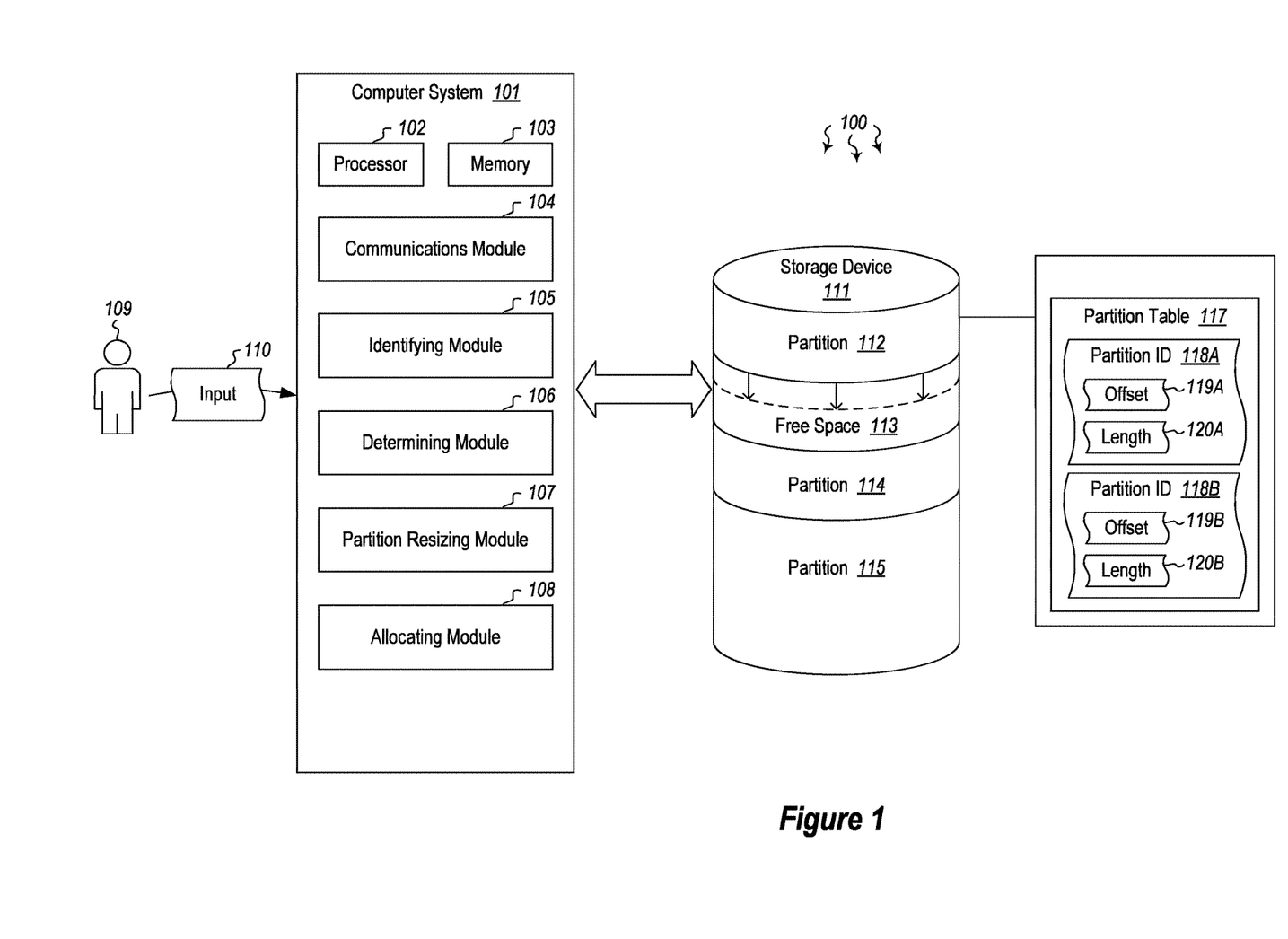
FIG. 1 illustrates a computer architecture in which embodiments described herein may operate including dynamically changing partitions size for a logical partition in a storage device.

As illustrated in FIG. 1, a computing system 101 typically includes at least one processing unit 102 and memory 103. The memory 103 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 103 of the computing system 101. Computing system 101 may also contain communication channels that allow the computing system 101 to communicate with other message processors over a wired or wireless network.

Embodiments described herein may comprise or utilize a special-purpose or general-purpose computer system that includes computer hardware, such as, for example, one or more processors and system memory, as discussed in greater detail below. The system memory may be included within the overall memory 103. The system memory may also be referred to as "main memory", and includes memory locations that are addressable by the at least one processing unit 102 over a memory bus in which case the address location is asserted on the memory bus itself. System memory has been traditionally volatile, but the principles described herein also apply in circumstances in which the system memory is partially, or even fully, non-volatile.

Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which at least one embodiment may be employed. Computer architecture 100 includes computer system 101. Computer system 101 may be any type of local or distributed computer system, including a cloud computing system. The computer system 101 includes modules for performing a variety of different functions. For instance, the communications module 104 may be configured to communicate with other computing systems. The communications module 104 may include any wired or wireless communication means that can receive and/or transmit data to or from other computing systems. The communications module 104 may be configured to interact with databases, mobile computing devices (such as mobile phones or tablets), embedded or other types of computing systems.

The computer system 101 may also include an identifying module 105 that is configured to identify free space within a storage device. For example, the identifying module 105 may identify free space 113 within storage device 111. This free space may be unpartitioned space, or simply space that does not have data stored in it (or both). The storage device, as shown in FIG. 1, is external to the computer system 101, and has three partitions 112, 114 and 115. However, it should be understood that the storage device 111 may be internal or external to computer system 101, and may include a single device or piece of media, or may include substantially any number of arrays or clusters or networks of storage devices or storage media. Moreover, the storage device 111 of FIG. 1 may include substantially any number of partitions prior to or after being partitioned by the computer system 101.

The computer system 101 may further include a determining module 106 that is configured to determine whether and where a new partition is to be created on the storage device 111. Once the determining module 106 has determined that a new partition is to be created, the allocating module 108 may allocate a new space that comprises a partition. The partition table 117 may be updated with the partition's new offset and length. Similarly, if an existing partition is to be resized, the partition resizing module 107 may resize the partition, updating the partition's offset and length in the partition table. In this manner, each partition on the storage device 111 may have an identifier (e.g. 118A or 118B), and a corresponding offset (e.g. 119B) and length (e.g. 120B). These concepts will be explained further below.

As the term is used herein, "disk partitioning" refers to the act of dividing a disk into multiple logical storage units referred to as "partitions". This allows the computer system, or more specifically, the operating system, to treat one hard disk or other type of storage device as if it were multiple disks. In this manner, different file systems may be used on each partition. (It should be noted here that, for simplicity, the storage device 111 may be referred to as a hard disk—as indicated above, however, the storage device 111 may be substantially any hardware storage device capable of storing digital or analog data). In some cases, it may not be possible to know up front how much capacity to dedicate to each partition. As such, storage capacity may be rebalanced between the partitions at a later time. Typical partitioning mechanisms do not provide a way to rebalance partitions without taking the partitions offline (or recreating the partitions). As a result, in many cases, partitions are over-provisioned initially to provide room for future data growth on the partition. This may result in wasted capacity if that extra storage space is never used.

Disk partition stitching, as the term is introduced herein, allows non-adjacent physical partitions (partition entries) to be stitched together into a contiguous logical partition. At this point, it may be beneficial to define the following terms: a "logical partition" or "fabric partition" is a partition that consists of different non-adjacent physical partitions. A "physical partition" or "patch partition" is a contiguous disk portion that is part of a logical partition. The physical partition is represented by a partition entry in the partition table (e.g. in a globally unique identifier partition table (GPT)) with information about which logical partition it belongs to, its location and size (i.e. offset and length). There may be parts of the logical partition that may not be backed by a physical partition. Flexible rebalancing between the logical partitions may be accommodated by either adding or deleting physical partitions, shrinking or extending disk portions from the ends of the physical partitions, or by unmapping disk portions from within the middle of a physical partition. The rebalancing or resizing of logical partitions may be performed while the logical partitions are online.

In some embodiments, partition stitching can be applied to GPT, MBR, or any other partition schemes. In such embodiments, a partition table may be used. In GPT and MBR partition tables, a new partition type is defined to identify a physical partition (or partition entry herein). A logical partition consists of >=1 disk portions. A normal partition (non-logical partition) may be converted into a logical partition when adding new disk portions to non-logical partitions, or when a command to unmap is sent to a non-logical partition, thus splitting non-logical partitions into multiple disk portions. A logical partition can be converted back to a normal partition when there is a single physical partition left.

During the conversion to a logical partition, a new placeholder partition entry may be created to persist the original non-logical partition's name, attributes, partition GUID, etc.

In one GPT disk embodiment, the original partition's GUID may be used to glue all physical partitions together to form a logical partition. The placeholder partition entry may also be used as a discovery volume (e.g. a small FAT12 volume) to hold a hint (e.g. readme.txt in plain text) to explain why physical partitions are laid out in such a way. For example, the placeholder partition entry may be laid out to prevent users from tampering with the physical partitions if the disk is mounted on a system that cannot process logical partitions. The placeholder partition's size may be set to be small (12 sectors, for example). In one embodiment, the partition entry for each physical partition is filled in as follows: the offset and length are saved in the Start offset & End offset fields, the logical partition's GUID is saved in the name field as string of (e.g. Unicode) characters in the format of: "xxxxxxxx-xxxx-xxxx-xxxx-xxxxxxxxxxxx" or "xxxxxxxx-xxxx-xxxx-xxxxxxxxxxxxxxxx" (36 characters wide, either null-terminated or not in this example). To support thin provisioning, the upper bits of the attributes field may be used to persist the logical start offset for this physical partition within the logical partition.

TABLE 1

| Offset | Length | Note |
|---|---|---|
| 0 (0x00) | 16 bytes | Partition type GUID: PARTITION_STITCH_GUID |
| 16 (0x10) | 16 bytes | Unique partition GUID |
| 32 (0x20) | 8 bytes | Start offset |
| 40 (0x28) | 8 bytes | End offset (inclusive) |
| 48 (0x30) | 8 bytes | Attribute flags (Upper 49 bits reused as Logical Partition Offset) |
| 56 (0x38) | 72 bytes | Name (Reused as Logical Partition GUID WCHAR string) |

Table 1 illustrates an example partition table entry with various fields. The offset identifies the location of the field within the partition table entry, while the length identifies the size of the field. In the example above, the attribute flag has 8 bytes: The upper 49 bits are reused as a logical partition offset (An embodiment may choose to let it start at 0.). The lowest 3 bits are defined by GPT to identify a system partition, legacy BIOS bootable etc. To do I/O against a logical partition, the logical partition offset is translated from logical offset into an offset against its physical partition. The I/O will be split if it is straddled across multiple physical partitions.

To protect an unmapped region on a logical partition, cover files (empty files with no allocation on disk that are pinned and cannot be moved to any other location) may be introduced to hide the unmapped region from the volume on top of the logical partition. Upon receiving an unmap command, cover files may be adjusted to cover the region described by the unmap command. If the unmap command failed, the cover files may be rolled back during cleanup; if the unmap command succeeded, the cover files may be committed to disk.

Partition stitching is generally more flexible in balancing partition capacity and more disk-resource efficient when compared with other solutions. Partition stitching allows stitching non-adjacent physical partitions into a logical partition to be surfaced as a single contiguous volume on disks (such as GPT disks). Thus, partition stitching allows dynamic rebalancing of partition sizes between the OS partitions, the data partitions, and any other partitions.

In some embodiments, thin provisioning support may be provided where a logical partition cannot reliably be shrunk from the end (e.g. when some files or other data is pinned or is otherwise unmovable). In thin-provisioning cases, a contiguous logical partition may be divided into three (or more) parts after the middle of one of its physical partitions is unmapped. Files may be defragmented or otherwise moved away from the middle of the physical partition. After the middle of the physical partition is freed, the original physical partition is split into three disk portions, and the newly created physical partitions for the first and third disk portions are stitched together. Because of thin provisioning, the sum of all logical partitions on a physical drive may be larger than the physical drive's size itself.

The following is an example workflow during boot illustrating how logical and physical partitions are handled inside a boot manager and operating system (OS) loader in a Unified Extensible Firmware Interface (UEFI) environment. The boot manager is loaded from a partition (e.g. an EFI system partition (ESP)) that may also be logical if the UEFI firmware can process logical partitions. The boot manager discovers the logical partition(s) and physical partition(s). The boot manager sets up input/output (I/O) paths for the logical partition, identifying the corresponding physical partitions using the partition entries in the partition table. For each disk, the boot manager reads the partition table. The boot manager scans through partition table to construct logical partition mappings. Once enumeration is over, logical partition I/O mappings are complete. The boot manager then finds each placeholder partition entry and replaces their I/O paths from dummy FAT discovery partition to the I/O mapping constructed above. The boot manager can now access the logical partition through these new I/O paths.

Continuing this example, the boot manager loads an OS loader from the boot partition and transfers control to the OS loader. The OS loader repeats what the boot manager does in enumeration for logical partition I/O mappings (the boot manager, the OS loader, and the OS may share a new common logical partition utility library). Once this is done, the OS loader loads the OS from the logical partition and transfers control to the OS. It should be noted that, in some cases, it may not be safe to pass the logical partition I/O mappings from the boot manager to the OS loader. This is because versions of boot manager and the OS loader may not match and thus data structures (in-memory) may not be compatible. As such, the I/O mappings are discovered by the boot manager and the OS loader and the OS. The cost of enumerating the partition(s) should be small.

Once the OS is loaded into memory, the partition manager may read partition table from the disk to process any remaining logical partitions. The partition manager exposes the logical partition to the volume manager as a "normal" contiguous partition with a size equal to the logical partition size (may be larger than (if there are holes) or equal to (if fully provisioned) the sum of all of the physical partitions). Any components sitting on top of the volume manager will not need to know there is a logical partition in the system. These concepts will be explained further below with regard to methods 200 and 300 of FIGS. 2 and 3, respectively.

Figure 2:
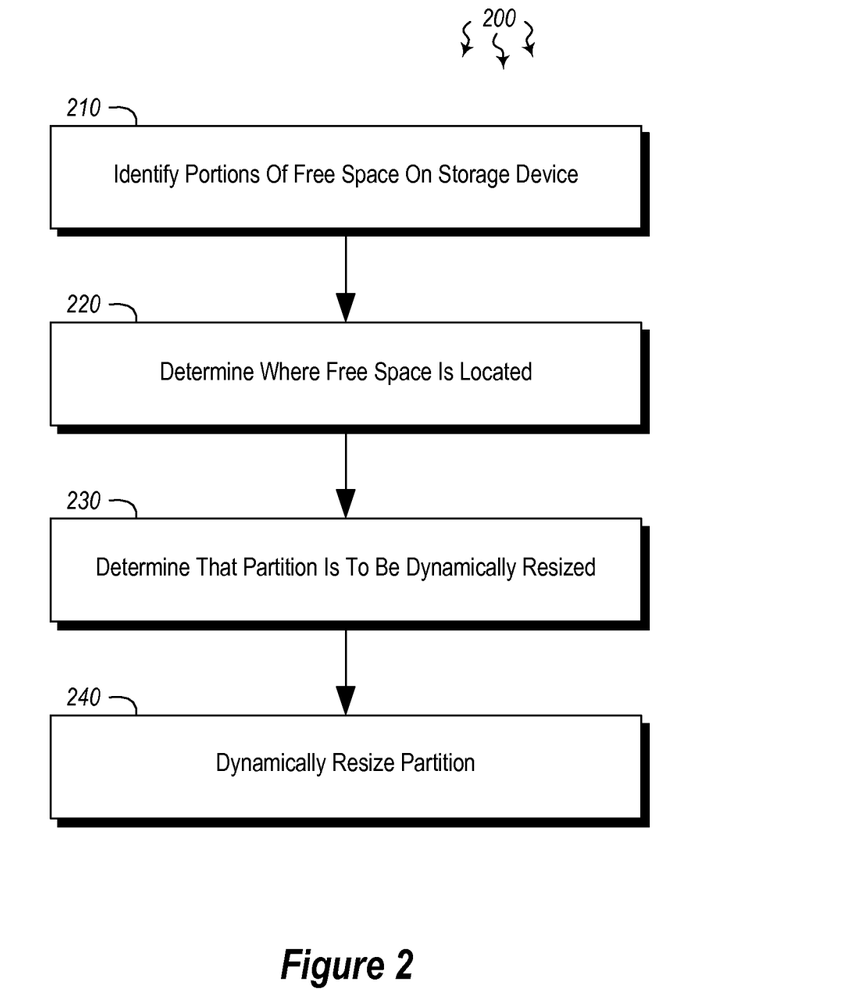
FIG. 2 illustrates a flowchart of an example method for dynamically changing partitions size for a logical partition in a storage device.
Figure 3:
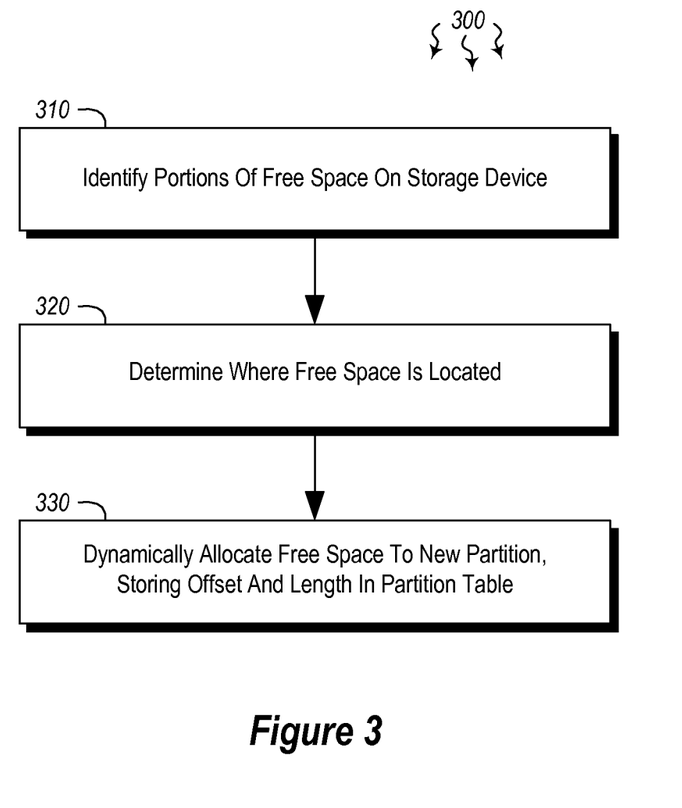
FIG. 3 illustrates a flowchart of an example method for transferring storage space between logical partitions in a storage device.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for dynamically changing partitions size for a logical partition in a storage device. The method 200 will now be described with frequent reference to the components and data of environment 100.

Method 200 includes identifying one or more portions of free space on the storage device, the storage device having at least one partition whose offset and length are stored in a partition table (210). For example, the identifying module 105 of computer system 101 may identify free space 113 on storage device 111. The storage device may have multiple partitions including partitions 112, 114 and 115. Each partition may have an identifier (e.g. 118A), an offset (e.g. 119A) and a specified length (e.g. 120A). As mentioned above, the partition identifier identifies the partition, the offset indicates where the partition is located relative to the start of the hard drive, and the length indicates the size of the partition. This metadata may be stored as a partition entry in the partition table 117.

It should be noted that while two partition identifiers are shown in the partition table 117 (IDs 118A and 118B), substantially any number of partition IDs may be stored in the partition table and, moreover, the IDs, offsets and lengths may be updated and changed when partitions are created, removed or resized. It should be further noted that previous partition resizing solutions may be implemented to extend a partition into the free space that is adjacent to the end of this partition. However, using these solutions, a partition cannot be extended if there is no free space adjacent to the end of the partition being extended. The embodiments described herein allow this partition to extend into a non-adjacent free space.

Method 200 next includes determining where the identified free space is located relative to other storage locations on the storage device (220). The determining module 106 of computer system 101 may determine where the identified free space 113 is located relative to other partitions (e.g. 112 and 114) of the storage device 111. Method 200 then determines that at least one of the partitions is to be dynamically resized to a new size that is specified by offset and length values (230. Then, based on where the identified free space 113 is located, the partition resizing module 107 may dynamically resize the partition, such that the partition's offset and length values are updated in the partition table to include the new specified offset and length values (240).

Thus, for example, the determining module 106 may determine that a certain amount of free space 113 exists between partitions 112 and 114 in storage device 111. The partition resizing module 107 may then be used to resize partition 115 by extending it into the free space 113. In some embodiments, the partition may be extended all the way to the next partition 114, or may be extended to a point that leaves some free space between partitions 112 and 114. When the resizing is complete (or perhaps prior to or during the resizing), a new physical partition with the offset 119B and length 120B for the free space 113 is created in the partition table 117. The partition table would thus include one placeholder partition entry for the logical partition 115 and two partition entries for the two non-adjacent disk portions stitched together using physical partitions. This partition resizing can be performed while the partition is online. Accordingly, data can be read from and written to the storage device while it is being dynamically resized. The metadata in the partition table 117 is dynamically updated to reflect any changes made to a partition, whether it be removal, creation, resizing or moving from one part of a drive to another. Similarly, partition 114 may be resized by growing into the free space 113.

Figure 4:
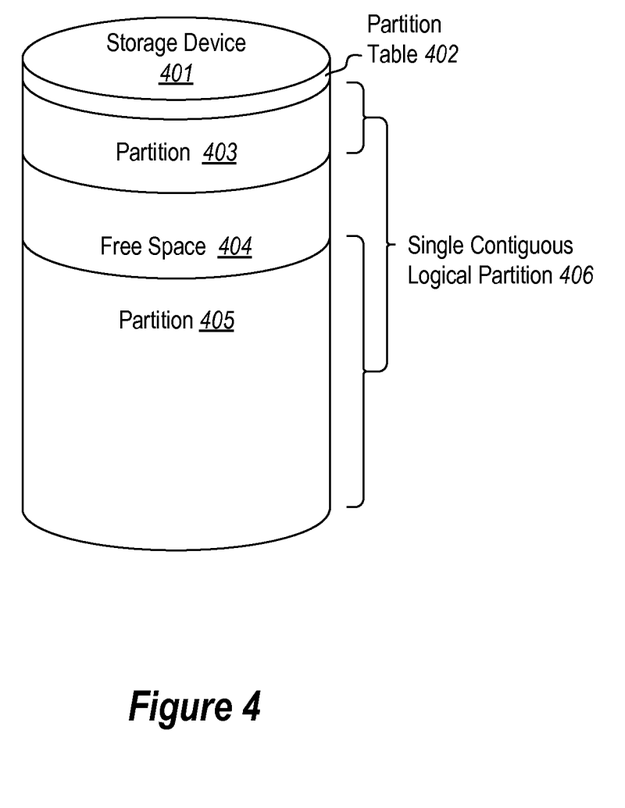
FIG. 4 illustrates an embodiment in which a single contiguous logical partition is established on a storage device.

In some embodiments, multiple physical partitions may be stitched together to form a single, logical partition. The stitched partitions do not need to be adjacent—indeed, a logical partition may include multiple non-adjacent physical partitions (partition entries). FIG. 4 illustrates an embodiment of a storage device 401 that includes a single contiguous logical partition 406, which is made up of physical partition 403 and physical partition 405. Physical partitions 403 and 405 are separated by a portion of free (i.e. unpartitioned) space 404. An identifier (for example, in GPT, a placeholder partition entry) is created in the partition table 117 for the single contiguous logical partition 406. Storing the identifier of the logical partition within the partition entries (for example, in GPT, within the name field) of the physical partitions 403 and 405, makes it possible to identify the corresponding logical partition 406. Alternatively, the placeholder partition may be able to store multiple offset and length values, one for each physical partition that was stitched into the full logical partition (e.g. 406). This stitching together of physical partitions may by dynamic and may occur in real time. Note that in the logical partition offset address space, physical partition 405 may start before physical partition 403. The logical partition may choose to map the physical partitions in any order to form logical partition address space. If the logical partition offset of partition 405 and partition 403 are not adjacent, this means that there is at least one unmapped region for this logical partition.

In some cases, the contiguous logical partition 406 may include at least one portion that is not backed by a physical partition. In some cases, a physical partition should not be created to represent this hole since logical partition can deduce where the holes are by parsing the corresponding physical partitions' logical offsets. As a consequence of these holes, the storage device may be represented as having more storage than it actually has. In FIG. 4, the contiguous logical partition 406 may include at least one portion that is not backed by a physical partition. The placeholder partition entry may store extra information (such as metadata) in addition to the identifier within the partition table 402 or as the sole repository for the metadata information. This flexibility in storing metadata allows for multiple and variable possibilities in the placement and modification of partitions on a storage device. It should further be noted that since the embodiments herein transform the original partition's partition entry as a physical partition, the original partition's identifier, name and attributes, etc. are persisted through the new placeholder partition.

Figure 6:
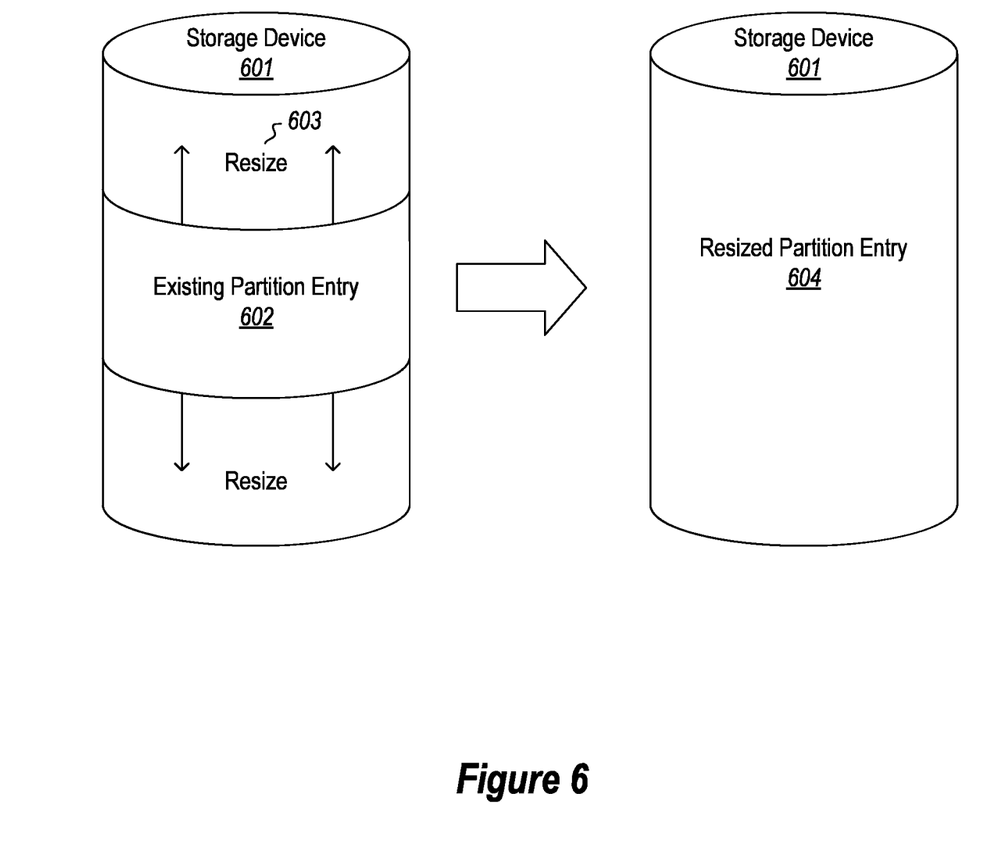
FIG. 6 illustrates an embodiment in which a logical partition is resized by expanding an existing partition entry.

In some cases, a name field associated with the physical partition may be used to save a partition identifier associated with the logical partition. The physical partition may be newly created, resized or moved. Dynamic resizing may involve adding or deleting physical partition/shrinking or extending an existing physical partition from the ends of the partition entry. For example, as shown in FIG. 6, a storage device 601 may have an existing physical partition 602. The existing partition entry may be resized toward the beginning of the partition entry and/or toward the end of the partition entry (as generally shown in resize arrows 603). If the existing physical partition 602 is resized in both directions, the resulting resized partition is shown as 604, encompassing the entire capacity of storage device 601. It will be understood, however, that the existing physical partition may be resized to some length in one direction, and to a larger or shorter length in the other direction. Moreover, space may be saved or gaps may be left within the storage device—the resizing need not go all the way to the ends of the drive. However, at least in some embodiments, there can be no overlap of logical partition offset ranges among all physical partitions in the same logical partition.

Figure 7:
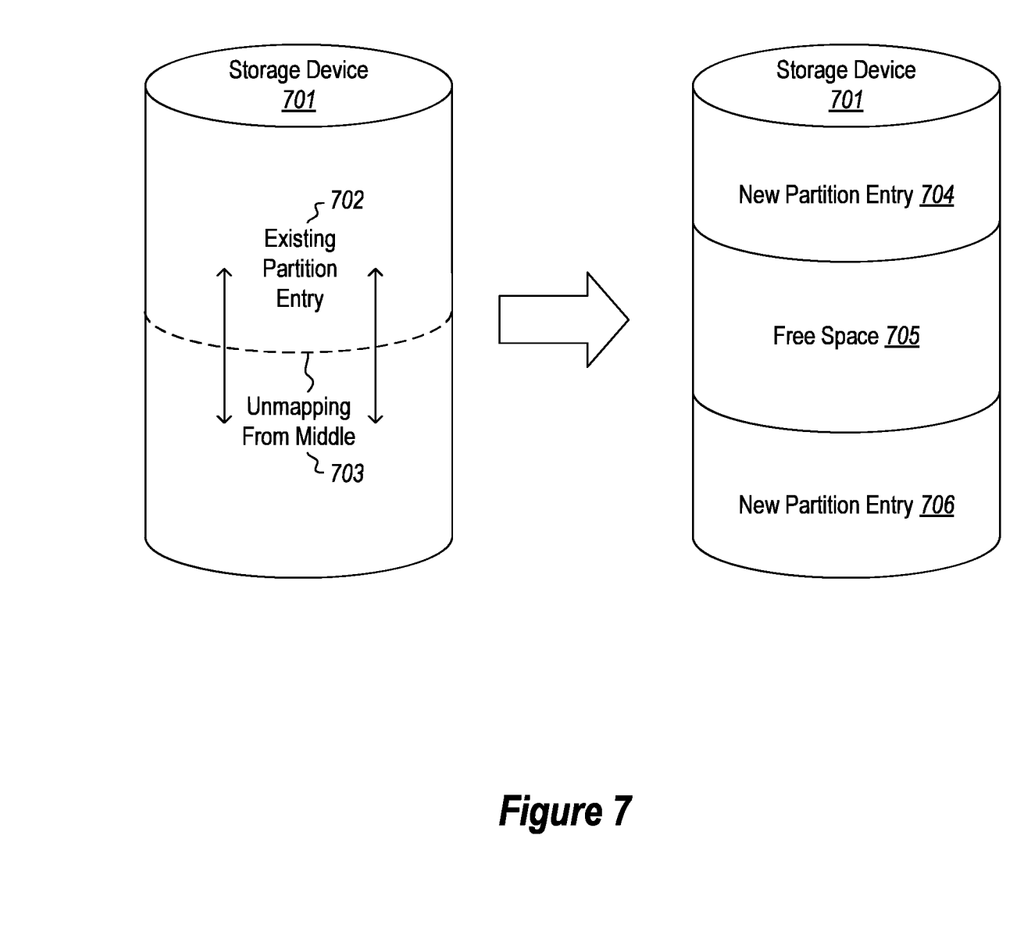
FIG. 7 illustrates an embodiment in which a disk portion is unmapped from within a specified portion of a logical partition.

Dynamic resizing may also include unmapping a disk portion from the middle of a partition. For example, as shown in FIG. 7, storage device 701 may include an existing physical partition 702 (inside a logical partition) that encompasses substantially all of the device's storage capacity. The partition mappings, as stored in the partition table 117, may be unmapped in step 703 and resized in each direction to create a free space 705 between new physical partitions 704 and 706. If further resizing is desired, new physical partitions may be further created out of physical partitions 704 and/or 706 by unmapping from the middle of those physical partitions and resizing outwards. It will be understood that while the term "middle" has been used herein to refer to the middle of the physical partition, the unmapping may begin from substantially any part of the physical partition, and may result in substantially any size physical partitions after the resizing. The size of the new physical partitions and/or the free space 705 may be specified by a user (e.g. 109) or by some other application, service or computing system.

In some cases, when partitions are resized, or when new logical partitions are created (e.g. 406), to avoid fragmenting the partition table, the computing system 101 may be designed to avoid creating physical partitions whenever possible. For example, the computer system 101 may look to resize any existing physical partitions to resize partitions. If partitions cannot be resized without creating new physical partitions (e.g. due to unmovable data located at a certain part in the partition or hitting existing partition's boundary, etc) new physical partitions may be created. However, the computer system 101 may be designed to minimize the number of physical partitions during this process.

Turning now to FIG. 3, a flowchart is illustrated of a method 300 for transferring storage space between partitions in a storage device. The method 300 will now be described with frequent reference to the components and data of environment 100.

Method 300 includes identifying one or more portions of free space on the storage device, the storage device having at least two existing partitions whose offset and length are stored in a partition table (310). For example, the identifying module 105 of computer system 101 may identify free space 113 on storage device 111. The determining module 106 may determine where the identified free space is located relative to other storage locations on the storage device (320). In FIG. 1, the free space 113 is located between partitions 112 and 114. Method 300 then includes dynamically allocating, based on where the identified free space is located, at least a portion of the determined free space to a new physical partition, where the new physical partition's offset and length are stored in the partition table such that the existing partition and the new physical partition are part of a single contiguous logical partition (330). The allocating module 108 of computer system 101 may dynamically allocate some of the free space 113 to a new physical partition.

Figure 5:
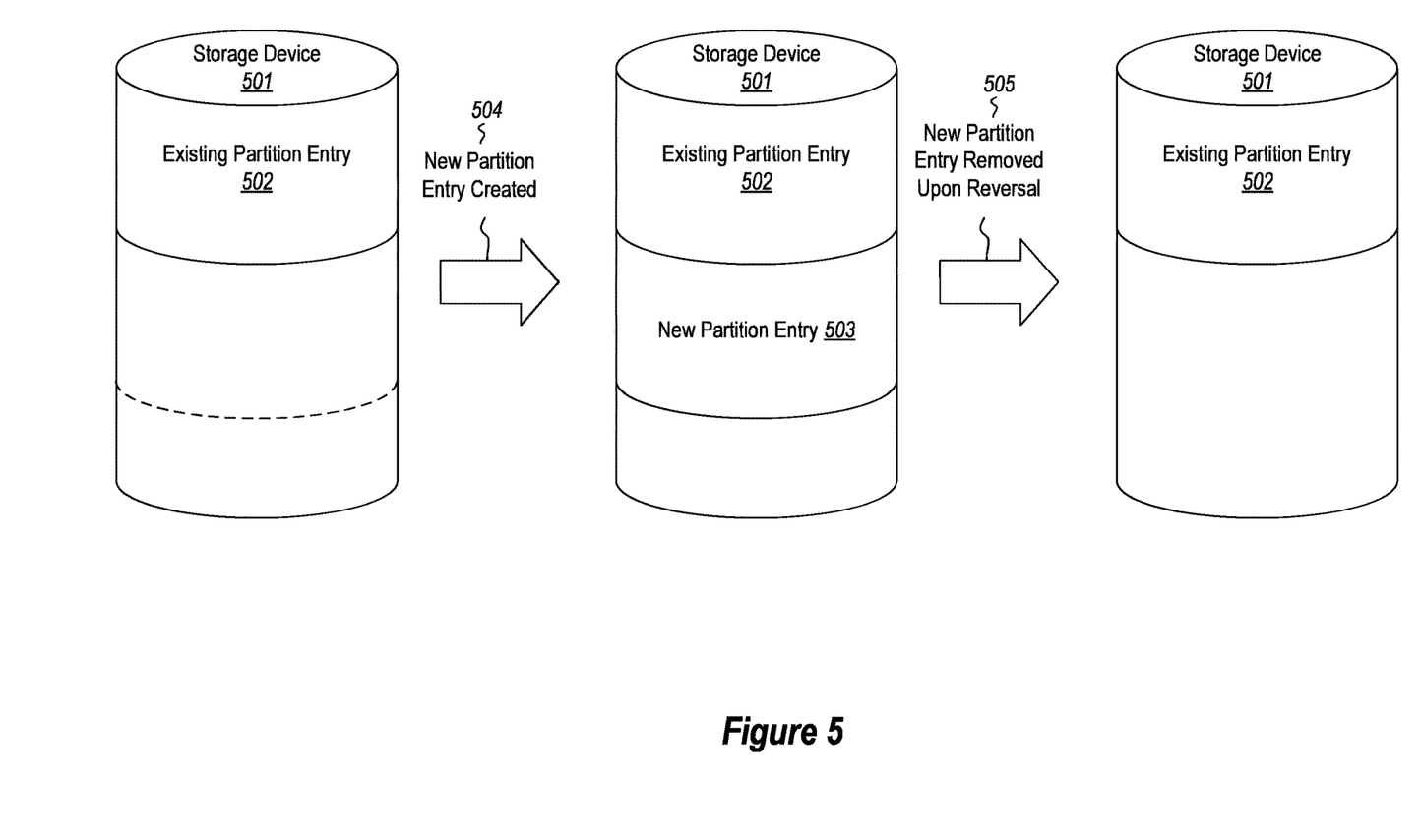
FIG. 5 illustrates an embodiment in which a new disk portion (partition entry) is created and subsequently removed from a logical partition.

For example, as shown in FIG. 5, storage device 501 may have an existing partition entry 502 and a portion of free space. If the free space is inside a partition, shrink or unmap the disk portion to free it out from that specific partition. Within this free space, the allocating module 108 of computer system 101 may allocate space for a new physical partition 503. As such, a new physical partition 503 is created in step 504. When new physical partitions are created, or when physical partitions are resized or moved, these actions may be reversible by reverting the changes to the partition table. Thus, in FIG. 5, if a user or other application desires to reverse the creation of a new physical partition or the resizing of an existing physical partition, the partition table may be reverted back to its original set of partition entries and, for example, the new partition entries 503 may be removed in step 505. This removal may be performed at the request of a user (e.g. in input 110 provided by user 109), or at the request of another application or computer system.

In some embodiments, the partition table is implemented to function as a data store. The partition table may store various types of data including attribute metadata or other types of data. The partition table may, for example, include partition identifiers, offset and length information for various partitions. In the example shown in FIG. 7, the existing partition entry 702 is unmapped from a specified point outward, resulting in new physical partitions 704 and 706, along with free space 705. In such cases, the partition table may store attribute data for the various partitions present on the storage device 701. The attribute data may include an offset and length for the first new partition entry 704 and an offset and length for the second new partition entry 706. These two new non-adjacent partition entries may be stitched together into a single logical partition (e.g. 406 of FIG. 4) by having a field within their partition entries contain the identifier of a new placeholder partition entry that represents the logical partition. A cover file may be used to prevent IO to a specified portion of logical partition address range that is unmapped. The cover file may thus indicate certain portions of logical partition address space that are not to be moved by defragmentation to any other logical partition address.

The identifying module 105 of computer system 101 may further be configured to identify unmovable data files in logical partitions. These may be operating system, meta-data or other files that are designated as being non-movable by file systems. In such cases, the computer system 101 may establish new free space in logical partition address space that exclude the unmovable data files. Accordingly, if the unmovable files were located toward the end of the logical partition, for example, the new free space would be established toward the front of the logical partition, and more particularly toward those portions of the front of the logical partition that did not include unmovable data. In other cases, the determining module 106 of computer system 101 may be used to determine whether a certain portion of data is to be moved prior to establishing a new free space. Once free space is created, it may be unmapped from the logical partition and assigned to a different logical partition by splitting the containing physical partition into two physical partitions around the free space and creating another new physical partition over the free space and associating the new physical partition with the other logical partition.

In some embodiment, if there is free space adjacent to the beginning of a physical partition, then the offset field of the existing physical partition entry may be updated to claim the free space (although this may not be common as the data within the partition is addressed by its relative offset to the beginning of the partition). As such, if the beginning of the partition changes, then the addresses of the data within the partition become incorrect. In such a situation, instead of updating the offset field of the existing partition entry, the steps described in FIG. 3 (i.e. 310-330) may be followed.

Still further, if free space were found adjacent to the beginning of a physical partition, the offset field for the partition entry may be updated to claim the free space. In some cases, a partition may make free space for another partition by unmapping from the middle using a cover file (as in FIG. 7), causing it to split into two partition entries. Later, if this partition needs to resize and part of the free space that it gave away earlier is now available (specifically, the part adjacent to the beginning of the second partition entry 706), then the partition can resize by simply reducing the size of the previously unmapped area (e.g. using a cover file) and then updating the offset field of partition entry 706. If this partition needs to resize and part of the free space that it gave away earlier is now available (specifically, the part adjacent to the end of the first partition entry 704), then it can resize by updating the offset of the previously unmapped area (e.g. using the cover file) and then increasing the length field of partition entry 704.

Claim support: One embodiment includes a computer system that has at least one processor. The computer system performs a computer-implemented method for dynamically changing partitions size for a partition in a storage device, the method comprising: identifying one or more portions of free space 113 on the storage device 111, the storage device having at least one partition 112 whose offset 119A and length 120A are stored in a partition table 117. The method further includes determining where the identified free space is located relative to other storage locations 114 on the storage device, determining that the partition is to be dynamically resized to a new size, the new size being specified by offset and length values, based on where the identified free space is located, dynamically transforming the partition into a logical partition, and resizing the logical partition, the logical partition's offset 119A and length 120A values being updated in the partition table 117 to include the new specified offset and length values.

In some embodiments, a placeholder partition is implemented to save metadata information associated with the partition before converting into a logical partition, each physical partition including information to identify itself as part of the logical partition. A name field and an attribute field are implemented in a globally unique identifier partition table (GPT) partition table associated with the new physical partition to save a partition identifier associated with the logical partition and logical offset of the physical partition. The metadata for the logical partition includes a logical offset, physical offset, and length for each physical partition. In some cases, dynamically resizing the logical partition comprises adding, deleting, shrinking or extending the physical partition, or unmapping logical partition offsets and lengths within the logical partition.

In another embodiment, a computer system that includes at least one processor performs a computer-implemented method for transferring storage space between partitions in a storage device, the method comprising: identifying one or more portions of free space 113 on the storage device 111, the storage device having at least two existing partitions 112, 114 whose offset 119A/119B and length 120A/120B are stored in a partition table 117, determining where the identified free space is located relative to other storage locations on the storage device and, based on where the identified free space is located, dynamically allocating at least a portion of the determined free space from a first logical partition 112 to a second logical partition 114, the logical partitions' information being stored in the partition table 117. In some cases, the method further includes implementing a cover file to prevent data movement of a specified portion of the logical partition. The existing partition and the new partition entry are physical-offset non-adjacent.

In another embodiment, a computer system is provided that includes the following: one or more processors, one or more computer-readable storage media having stored thereon computer-executable instructions that, when executed by the one or more processors, cause the computing system to perform a method for dynamically changing partitions size for a partition in a storage device, the method comprising the following: identifying one or more portions of free space 113 on the storage device 111, the storage device having at least one partition whose offset 119A and length 120A are stored in a partition table 117, determining where the identified free space is located relative to other storage locations on the storage device, determining that the partition is to be dynamically resized to a new size, the new size being specified by offset and length values and, based on where the identified free space is located, dynamically transforming the partition into a logical partition, resizing the logical partition, the logical partitions' offset 119A and length 120A values being updated in the partition table 117 to include the new specified offset and length values, wherein the new logical partition is reversible such that, upon reversal, the original partition table layout is restored.

In some cases, a placeholder partition is implemented to save metadata information associated with the partition before converting to a logical partition, each physical partition including information to identify itself as part of the logical partition, and wherein a name field and an attribute field in a globally unique identifier partition table (GPT) partition table are associated with the new physical partition to save a partition identifier associated with the logical partition and logical offset of the physical partition. The contiguous logical partition includes at least one portion that is not backed by a physical partition, the logical-to-physical mapping being stored within the partition table of the storage device. The method further identifies one or more unmovable data files from the first partition and establishing the new partition entry in a location that excludes the unmovable data files. The method further includes determining whether a portion of data is to be moved prior to establishing the new partition entry. Dynamically allocating at least a portion of the determined free space to the new partition entry is reversible such that the new partition entry is removed, and the contiguous logical partition includes at least one portion that is not backed by a physical partition.

Accordingly, methods, systems and computer program products are provided which dynamically change partitions size for a partition in a storage device. Moreover, methods, systems and computer program products are provided which transfer storage space between partitions in a storage device.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A method, implemented at a computer system that includes at least one processor, for dynamically changing a partition size of a partition in a storage device, the method comprising:
    identifying a portion of free space on the storage device, the storage device having a logical partition, the logical partition comprising at least a first patch partition that is adjacent to the portion of free space and a second patch partition that is not adjacent to the portion of free space, both the first patch partition and the second patch partition comprising a contiguous disk portion, the first patch partition including an identification of the corresponding logical partition, a first offset, and a first length that are each stored in a partition table, and the second patch partition including an identification of the corresponding logical partition, a second offset, and a second length that are each stored in the partition table;
    determining a location of the identified portion of free space relative to the first patch partition and the second patch partition of the storage device;
    determining that the second patch partition is to be dynamically resized to a new size by at least partially extending the second patch partition into the identified portion of free space that is not adjacent to the second patch partition; and
    dynamically resizing the second patch partition to the new size, including generating a placeholder partition entry within the partition table that is associated with a newly created logical partition corresponding to a new patch partition created within the identified free space and the second patch partition, wherein partition table entries associated with an offset and a length of both the new patch partition and the second patch partition are each stored in the partition table.

2. The method of claim 1, wherein the first and second patch partitions are stitched together to form the logical partition using a placeholder partition that represents the logical partition.

3. The method of claim 2, further comprising implementing a name field and an attribute field in a globally unique identifier partition table (GPT) partition table for each patch partition.

4. The method of claim 1, wherein the second patch partition remains online while it is being dynamically resized, such that data can be read from, and written to, the second patch partition during dynamic resizing.

5. The method of claim 1, wherein metadata associated with the logical partition is also stored in the partition table, the metadata including a logical offset, patch offset, and length for each patch partition.

6. The method of claim 1, wherein the logical partition includes at least one portion that is not backed by a physical partition.

7. The method of claim 1, wherein dynamically resizing the second patch partition also comprises adding, deleting, shrinking or extending the second patch partition.

8. The method of claim 1, wherein dynamically resizing the second patch partition also comprises unmapping disk portions of the second patch partition.

9. A computer program product comprising at least one hardware storage device having stored thereon computer-executable instructions that are executable by one or more processors of a computer system to cause the computer system to dynamically change a partition size of a partition in a storage device, the computer-executable instructions including instructions that are executable to cause the computer system to perform at least the following:
    identify a portion of free space on the storage device, the storage device having a logical partition, the logical partition comprising at least a first patch that is adjacent to the portion of free space and a second patch partition that is not adjacent to the portion of free space, both the first patch partition and the second patch partition comprising a contiguous disk portion, the first patch partition including an identification of the corresponding logical partition, a first offset, and a first length that are each stored in a partition table, and the second patch partition including an identification of the corresponding logical partition, a second offset, and a second length that are each stored in the partition table;
    determine a location of the identified portion of free space relative to the first patch partition and the second patch partition of the storage device;
    determine that the second patch partition is to be dynamically resized to a new size by at least partially extending the second patch partition into the identified portion of free space that is not adjacent to the second patch partition; and
    dynamically resize the second patch partition to the new size, including generating a placeholder partition entry within the partition table that is associated with a newly created logical partition corresponding to a new patch partition created within the identified free space and the second patch partition, wherein partition table entries associated with an offset and a length of both the new patch partition and the second patch partition are each stored in the partition table.

10. The computer program product of claim 9, wherein the first and second patch partitions are stitched together to form the logical partition using a placeholder partition that represents the logical partition.

11. The computer program product of claim 10, wherein a globally unique identifier partition table (GPT) partition table that includes a name field and an attribute field is implemented for each patch partition.

12. The computer program product of claim 9, wherein a cover file is implemented to prevent data movement of a specified portion of the logical partition.

13. A computer system comprising:
    or more processors; and
    one or more computer-readable storage media having stored thereon computer-executable instructions that are executable by the one or more processors to cause the computer system to dynamically change a partition size of a partition in a storage device, the computer-executable instructions including instructions that are executable to cause the computer system to perform at least the following:
    identify, on the storage device, one or more portions of free space and a plurality of patch that each comprise a contiguous disk portion, each of the plurality of patch partitions including an offset, and a length that are each stored in a partition table;
    determine that a particular patch partition of the plurality of patch partitions is to be dynamically resized to a new size by at least partially extending the particular patch partition into a portion of free space of the one or more portions of free space;
    in response to determining that the particular patch partition is to be dynamically resized to the new size, identify the portion of free space to which the particular patch portion can be extended;

determine that a location of the identified portion of free space is not adjacent to the particular patch partition of the storage device; and dynamically resize the particular patch partition to the new size, including generating a placeholder partition entry within the partition table that is associated with a newly created logical partition corresponding to a new patch partition created within the identified portion of free space and the particular patch partition, wherein partition table entries associated with an offset and a length of both the new patch partition and the particular patch partition are each stored in the partition table.

14. The computer system of claim 13, wherein the logical partition includes at least one portion that is not backed by a physical partition.

15. The computer system of claim 13, wherein the first and second patch partitions are stitched together to form the logical partition using a placeholder partition that represents the logical partition.

16. The computer system of claim 13, wherein the second patch partition remains online while it is being dynamically resized, such that data can be read from, and written to, the second patch partition during dynamic resizing.

17. The computer system of claim 13, wherein metadata associated with the logical partition is also stored in the partition table, the metadata including a logical offset, patch offset, and length for each patch partition.

18. The method of claim 8, wherein unmapping comprises unmapping from a middle disk portion of the at least one patch partition.

19. The computer system of claim 13, wherein dynamically resizing the second patch partition also comprises unmapping disk portions of the second patch partition.

20. The method of claim 4, further comprising:

receiving a request for data stored at the second patch partition during dynamic resizing of the second patch partition; and providing the requested data during dynamic resizing of the second patch partition.

\* \* \* \* \*